United States Patent [19]

Shulman et al.

[11] Patent Number: 4,545,648
[45] Date of Patent: Oct. 8, 1985

[54] NACREOUS TRANSFLECTOR ILLUMINATION SYSTEM FOR LIQUID CRYSTAL DISPLAY

[75] Inventors: Joseph Shulman, Hyde Park; David L. Clifford, Sherborn, both of Mass.

[73] Assignee: Polaroid Corporation, Cambridge, Mass.

[21] Appl. No.: 202,374

[22] Filed: Oct. 30, 1980

[51] Int. Cl.⁴ ............................................. G02F 1/13
[52] U.S. Cl. ................................... 350/337; 350/345; 350/338
[58] Field of Search ....................... 350/337, 345, 338

[56] References Cited

U.S. PATENT DOCUMENTS

| | | | |
|---|---|---|---|
| 3,219,734 | 11/1965 | Mattin | 428/1 X |
| 3,857,628 | 12/1974 | Strong | 350/337 |
| 4,025,688 | 5/1977 | Nagy et al. | 350/337 X |
| 4,096,550 | 6/1978 | Boller et al. | 350/345 X |
| 4,126,383 | 11/1978 | Doriguzzi et al. | 350/345 X |
| 4,151,666 | 5/1979 | Raphael et al. | |
| 4,196,973 | 4/1980 | Hochstrate | 350/345 X |
| 4,355,868 | 10/1982 | Perregaux et al. | 350/345 X |

Primary Examiner—John K. Corbin
Assistant Examiner—Richard F. Gallivan
Attorney, Agent, or Firm—Louis G. Xiarhos

[57] ABSTRACT

An improved illumination system for electro-optical liquid crystal display devices comprising a nacreous transflector element capable of transmission as well as reflection of light so as to accommodate effective display illumination in conjunction with external and/or internal light sources for enhanced display viewability under all ambient lighting conditions.

11 Claims, 3 Drawing Figures

U.S. Patent   Oct. 8, 1985   Sheet 1 of 2   4,545,648
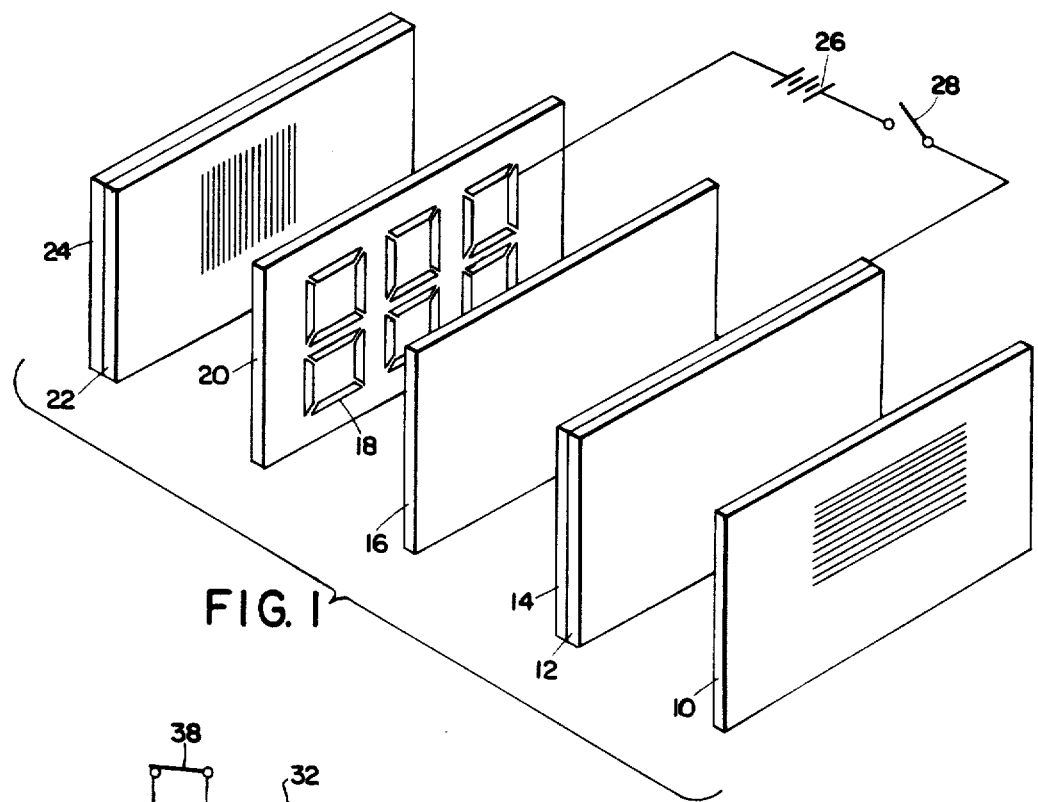
FIG. I
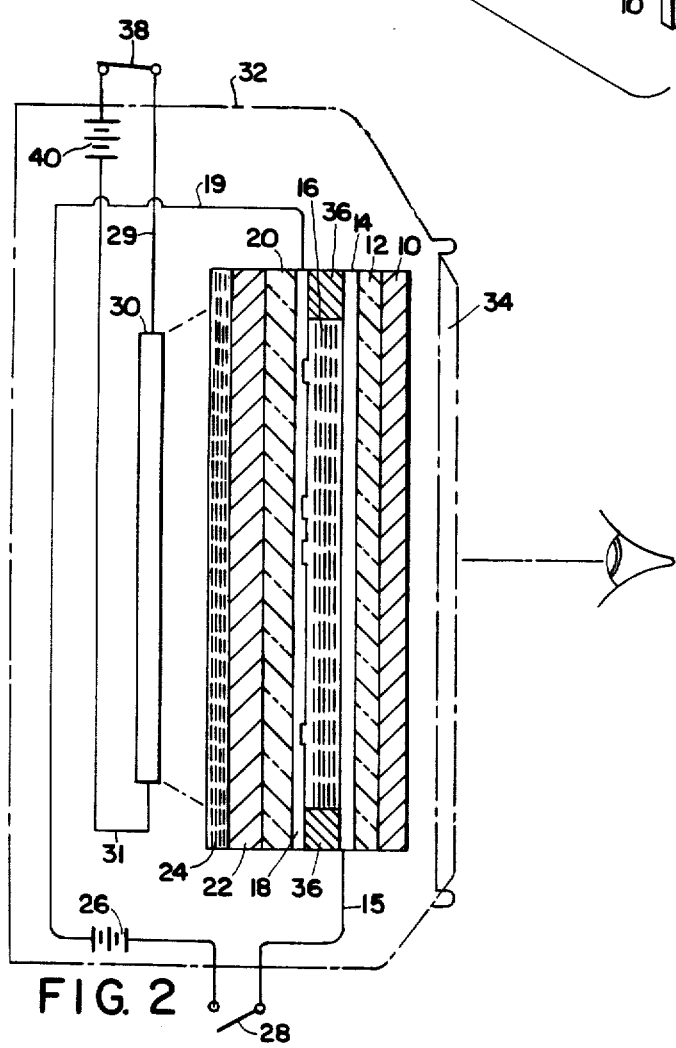
FIG. 2

NACREOUS TRANSFLECTOR ILLUMINATION SYSTEM FOR LIQUID CRYSTAL DISPLAY

BACKGROUND OF THE INVENTION

Electro-optical display devices have been the object of considerable research effort in recent years. Of the various display systems that have been developed, devices utilizing liquid crystals, in particular, have drawn commercial interest. For example, liquid crystal devices have found popular utility in display applications such as wrist watches, calculators, clocks, and the like.

Compositions characterized as liquid crystals include a wide range of materials. The different electrical and optical properties exhibited by these liquid crystalline materials make possible a number of mechanisms for light modulation. Such mechanisms include phase transitions, dynamic scattering and field effects, all of which are well known in the art.

Field effect devices have found particular utility. The effect that is commercially most significant at present is the rotation of polarized light by a twisted nematic liquid crystal alignment and the disappearance of this effect when an electric field is applied across the device. These twisted nematic liquid crystal devices basically consist of a suitable liquid crystal composition sandwiched between two optically transmissive plates having transparent conductive films affixed to their surfaces facing one another in the device. The alignment of the surface layers of the liquid crystal in the off-state of the device is determined solely by the interaction of the liquid crystal composition with the confining surfaces of the display device. The orientation of the surface layers of the liquid crystal is propagated throughout the bulk of the composition. The nature of the alignment is an extremely important factor because it determines the off-state optical properties of the device and the manner in which the liquid crystal molecules will be reoriented by an applied electric field.

To effect orientation of a confined liquid crystal, the internal surfaces of the conductive plates of a sandwich display device can be prepared by unidirectionally rubbing the surfaces prior to fabrication of the device. The liquid crystal molecules immediately adjacent each rubbed surface tend to orient themselves in the same direction as the rubbing. By arranging the opposing conductive plates with the axis of the rubbed surfaces at right angles to each other, the liquid crystal molecules at points intermediate the two plates will orient themselves to a degree which is a function of the distance from the two plates. Accordingly, the liquid crystal will align itself in a continuous spiral path that twists through a 90° angle between the opposing plates.

If the sandwich device is mounted between two crossed light polarizer elements, polarized light will pass into the device and be rotated through a 90° angle as it is transmitted through the twisted nematic crystal composition from one surface of the device to the other. Due to the 90° light rotation effected by the twist of the liquid crystal, the polarized beam will be set to pass through the second crossed polarizer mounted on the opposing side of the display. By positioning a light reflector behind the second polarizer, the polarized beam can be reflected back through the second polarizer to rotate through the confined liquid crystal and then exit out the first polarizer where it was introduced.

When an electric field is applied across the liquid crystal composition between the two conductive plates, the twisted orientation of the liquid crystal is obliterated as the molecules align themselves with the applied field. As the liquid crystal is untwisted, polarized light entering the device through the first polarizer will no longer be rotated 90° as it is transmitted through the liquid crystal. Therefore, the nonrotated light will be unable to pass through the second polarizer which is set crossed to the first polarizer; the light will be blocked from reaching the rear reflector and hence will not be reflected back through the device. Selective application of voltages across discrete segments of the liquid crystal device can readily accomplish patterns of bright areas (no applied electric field, resulting in reflected light) and dark areas (applied electric field, resulting in no reflected light) to form a desired arrangement.

Operation of the liquid crystal display device, as described above, is dependent upon the introduction of light through the front surface of the display. Under conditions of sufficient ambient light, the reflective illumination arrangement is adequate, but reduced ambient light, or darkness, diminishes suitable contrast for the display elements and renders the illumination ineffective. Accordingly an internal, supplemental lighting means is required to enhance illumination and make the display readable regardless of ambient lighting conditions. Various such lighting systems have previously been proposed. Many of these lighting schemes involve the introduction of illumination along the peripheral edges of the sandwich display. This light then is reflected off the rear reflector to effect transmission through the selected portions of the liquid crystal composition and out the front of the device for observation. Typical such side-lighting arrangements are shown, for example, in U.S. Pat. Nos. 3,864,905; 3,881,809; 3,994,564 and the like. However, inefficient diffusion and reflection of the side-introduced light often achieves less than ideal display illumination.

SUMMARY OF THE INVENTION

Now, according to the present invention, an improved illumination system for an electro-optical display device is provided which incorporates a nacreous pigment-containing transflector element. The nacreous transflector is specifically designed to replace the standard reflector element in a twisted nematic liquid crystal display device; the transflector advantageously is deployed behind the second light polarizer set behind the rear optically transmissive conductive plate of the sandwich device. In this position, the transflector serves to reflect incident light entering the front of the unit and passing through the polarizers and the liquid crystal, in the same manner as previously employed reflectors. Nacreous materials, however, offer the unique property of being partially reflective and partially transmissive of incident light. Accordingly, while the nacreous transflector element of the present invention provides a surface having a degree of reflectance sufficient to present a readable liquid crystal display under normal daylight conditions, it also is sufficiently light transmissive to advantageously accommodate introduction of light to a display from a source positioned behind the transflector panel. Accordingly, uniform distribution of illumination can be accomplished to provide a display having sharp and distinct elements for observation under conditions of low ambient light or darkness.

Nacreous materials or pigments are products well known in the art. The pigment particles in nacreous pigments are plate-like in structure, and are commonly used to impart a pearl luster to objects on which or in which they are used. Further details regarding such pigments can be found, for example, in *Nacreous Pigments*, L. M. Greenstein, Encyclopedia of Polymer Science and Technology, Vol. 10 (1969) p. 193-211, and in U.S. Pat. Nos. 3,331,699; 3,138,475; 3,123,490; 3,123,489; 3,071,482; 3,008,844 and 2,713,004.

Any such nacreous pigment material that exhibits suitable light reflectance and transmission properties can be used in the present invention. Typical commercially available nacreous pigment materials that are suitable for use in the present invention are listed below in Table A. As indicated by the reflection and transmission coloration notations in the table, a wide range of display coloration is made available through the use of nacreous materials, and/or mixtures thereof, offering significant decorative possibilities and optimum display element contrasts.

TABLE A

| Nacreous Pigment* | Transmission Coloration | Reflection Coloration |
| --- | --- | --- |
| Flamenco Super Pearl | Transparent White | White |
| Flamenco Pearl | Translucent White | White |
| Flamenco Blue | Yellow | Blue |
| Flamenco Green | Red | Green |
| Flamenco Gold | Blue | Gold |
| Flamenco Red | Green | Red |
| Supersilk | Pearl Effect | Pearl Effect |
| Mearlin Sparkle | Pearl Effect | Pearl Effect |
| Merlin Supersparkle | Pearl Effect | Pearl Effect |
| Duochrome BY | Blue | Gold |
| Duochrome RB | Red-Blue | Blue |
| Duochrome RY | Red-Blue | Gold |
| Duochrome GY | Green-Gold | Gold |
| Duochrome RG | Red-Blue | Green |
| Duochrome BG | Blue | Green |
| Duochrome BR | Blue | Red |
| Duochrome YG | Gold | Green |
| Nacromer ZNC-B | Colorless | Silver |
| BIJU BWD | Colorless | Silver |
| Murano MGNS | Red | Green |
| Murano MYNS | Blue | Gold |
| Murano MBNS | Yellow | Blue |
| Murano MYVT | Blue | Gold |
| Murano MRVT | Green | Red |

*The listed nacreous pigments are commercially available from the Mearl Corporation.

The nacreous transflector element may assume a variety of constructions and the actual method of fabrication is not critical. Favorable results have been obtained by dispersing the pigment in a binder and then coating the dispersion on a suitable light transmissive support sheet. For example, the nacreous material may be coated on glass or polymeric sheets such as polyethylene, polypropylene, polymethacrylic acid-methyl and ethyl esters, vinyl chloride polymers, polyvinyl acetal, polyamides, polyesters, and cellulose derivatives—including cellulose acetate, triacetate, nitrate, propionate, butyrate, acetate-propionate and acetate-butyrate. If desired, the pigment may be dispersed within the support sheet itself. However, coating the pigment in a binder medium has been found to be convenient and effective; the resulting nacreous pigment layer presents a durable, mar-resistant surface that is not sensitive to handling encountered during display assembly operations. Preferably, both the binder medium and the support sheet should feature a low refractive index. Since liquid crystal systems are commonly used in display application, such as watches, where space is at a premium, a preferred means to support the nacreous transflector layer is to coat a dispersion of the pigment on the back side of an optical polarizer element. This polarizer transflector element then conveniently can be used as the rear polarizer element of a liquid crystal display. In this manner, the need for an additional support element is eliminated. The polarizer element may be comprised of any of a variety of materials which produce the desired light-polarization effects. Preferred, and the most widely used type of synthetic polarizer, is the polyvinyl alcohol-iodine complex polarizer; it consists of a unidirectionally stretched, linearly oriented polyvinyl alcohol sheet, supported on a suitable transparent, isotropic plastic material, such as cellulose acetate butyrate, and stained with a polyiodide solution. Such polarizers are commercially available from Polaroid Corporation as type H polarizer sheet. Suitable polarizing materials are further described in U.S. Pat. Nos. 2,173,304; 2,255,940; 2,306,108; 2,397,231; 2,445,555; 2,453,186 and 2,674,159. In this preferred embodiment of the transflector, the rear optical polarizer element is mounted in the device with its polarizer side facing the front polarizer, and the transflector side rearmost in order to accommodate selective light screening by the polarizer prior to reflection, or transmission of light back through the display for observation.

Any binder medium capable, on drying, of effectively holding the nacreous pigment layer to the support sheet can be used. A wide choice of binders can be employed, favorable coatability and lack of optical interference being the only significant criteria. Other factors that should be considered in binder selection are desired coating viscosity, moisture resistance of the dried coating, coating durability, an advantageous solvent system, and the like. Preferably, the binder medium should have a low refractive index. Typical water-soluble binders include polyvinyl alcohol, polyvinyl pyrolidone, hydroxyethyl cellulose, methyl cellulose, polyvinylacetate, polyethyleneacrylic acid, and the like. Polyvinyl alcohol is a preferred binder medium. Suitable commercially available polyvinyl alcohol compositions include material sold under the trademark "VINOL" from Air Products Co., "CANDOC" from Cudner and O'Connor Co. and "ELVANOL" from E. I. duPont de Nemours Chemical Co.

Pigment to binder ratios can vary depending on the desired coating properties. Using a polyvinyl alcohol binder medium, pigment loadings having about a 1:10 to a 1:2 pigment to binder ratio (parts by weight) have been found to be advantageous.

The thickness of the nacreous pigment layer generally also can vary preferably, coverages range from about 2500 to about 7000 mg/ft$^2$ (about 26910–about 75347 mg/m$^2$). Lowering coating coverages produces reduced light reflection and enhanced transmission; increasing coating coverages produces enhanced reflectance with reduced transmission.

Since the nacreous material consists of finely divided pigment platelets, a transflector element can be provided featuring a granular surface to effect light scattering and reflection and produce a soft textured background for the display. Such an arrangement offers a display having a large viewing angle and avoids background reflections and glare which detract from the viewability of standard mirror or metallized reflector elements. Various additives may be included to enhance desirable properties. For example, such materials as titanium dioxide, silica, or glass beads may be added to enhance optical properties or impart graininess.

BRIEF DESCRIPTION OF THE DRAWINGS

The invention may be further understood by reference to the figures:

FIG. 1 is a magnified, exploded, perspective view of a liquid crystal display unit.

FIG. 2 is a cross-sectional view of an encased liquid crystal display including a back-lighting arrangement.

DETAILED DESCRIPTION OF THE PREFERRED EMBODIMENTS

Figure 3:
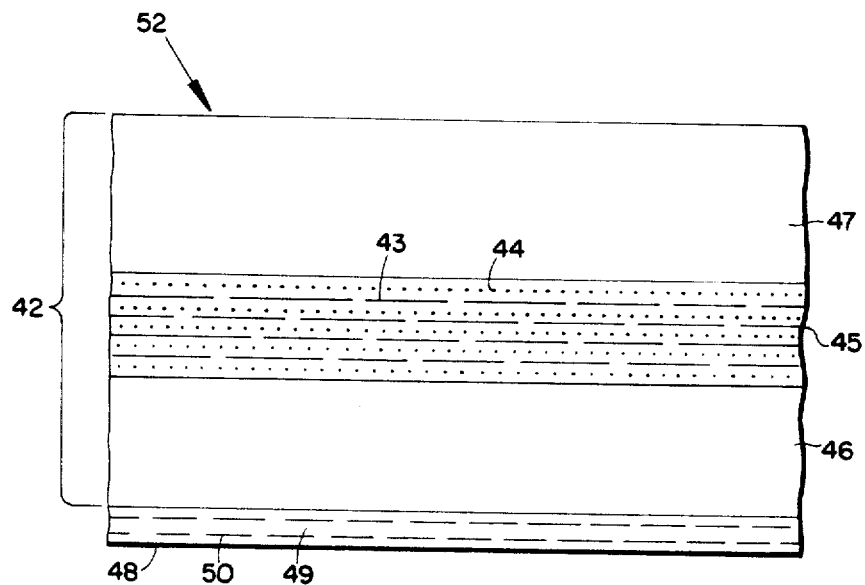
FIG. 3 is an exaggerated, diagrammatic side view of a preferred polarizer/transflector embodiment.

Referring to FIG. 1, the depicted liquid crystal display sandwich-like unit consists of a first optically transmissive plate 12 supporting conductive coating 14 on its interior surface. Plate 12 may be made of any suitable transparent or translucent sheet material including glass, plastic, and the like. Conductive coating 14 can be any conductive material of suitable optical quality; transparent conductive coatings of metallic oxides, such as tin oxide, are well known in the art. Set opposite plate 12 is a second optically transmissive plate 20, which also includes on its surface, facing plate 12, a conductive coating arranged as numerical elements 18. Plate 20 and conductive elements 18 may be composed of the same materials as plate 12 and coating 14, respectively. Sandwiched between the two plates is a layer of a twisted nematic liquid crystal composition 16. Set on either side of the sandwich arrangement are front polarizer 10 and rear polarizer 22 whose polarizing axes are disposed at right angles to each other. Behind rear polarizer 22 is positioned nacreous transflector layer 24.

Conductive coatings 14 and 18 are connected by suitable electrical leads so that a voltage can be applied across liquid crystal composition 16 by means of an electrical source 26, typically a battery, by closing switch 28. The simplified diagram illustrates only one element 18 connected to the electrical source, but means are commonly available in the art for selectively activating each of the numerical elements for forming desired numerical displays.

In order to effect the desired twist to the confined nematic liquid crystal composition, the conductive surfaces 18 and 14 of plates 20 and 12 have been unidirectionally rubbed, the axes of the rubbed surfaces offset 90° to each other.

Light entering the front of the display device through front polarizer 10 will pass through optically transmissive plate 12 and conductive coating 14 and enter the liquid crystal composition layer 16. Passing through layer 16, the polarized beam of light will follow the twist formed in the liquid crystal and be rotated 90°, so that upon reaching crossed polarizer 22, after passing through the second optical transmissive plate 20 and conductive elements 18, the light will be transmitted through the polarizer to be reflected by transflector 24. The reflected light, retracing the same route in reverse, will pass through the sandwich arrangement and be readily observed.

FIG. 2 illustrates an embodiment of the present invention wherein a liquid crystal arrangement, including a nacreous transflector, is phantomly enclosed in a watch-like case 32 and is viewed through cover glass 34. The elements of the display comprise front optical polarizer 10; and, optically transmissive plate 12, supporting conductive coating 14, and optically transmissive plate 20, supporting conductive elements 18, sandwiching twisted nematic liquid crystal composition 16 between spacer gasket 36. Set behind plate 20 is rear optical polarizer 22, arranged with its polarizing axis 90° out of phase with front polarizer 10. The back surface of rear polarizer 22 is coated with nacreous pigment material to form transflector layer 24. The two conductive members, elements 18 and coating 14, are connected to electrode leads 15 and 19, so that an electric field can be applied across liquid crystal 16 by means of electrical source 26, typically a small battery, by closing switch 28, conveniently located on the case of the watch. To simplify the presentation, the segmented conductive elements 18 are shown connected as a unit, although in an actual display the individual segments will be connected for selective activation, using means well known in the art. Either of the conductive members could form the segment arrangement; it is not critical whether the segmented elements form the front or rear electrode.

Positioned behind the sandwich display arrangement is a light source 30, such as an incandescent bulb, connected to a suitable power source, such as battery 40, by means of electrical leads 29 and 31. The light can be activated by closing switch 38, conveniently mounted on the watch case.

In operation, ambient light enters the front of the display through cover glass 34 and is polarized as it passes through front polarizer sheet 10. The polarized light then is transmitted through plate 12 and conductive coating 14 whereupon it enters liquid crystal composition layer 16. Conductive surfaces 14 and 18 have been unidirectionally rubbed at right angles to each other, so that nematic liquid crystal 16 assumes a twisted mode under conditions of no applied voltage. As the polarized light beam passes through the liquid crystal, it will be twisted 90° out of phase in all areas where no voltage has been applied, and will pass through untwisted in areas across which an electrical field has been applied through selective activation of conductive elements 18. Upon exiting the liquid crystal composition, light will pass through conductive elements 18 and optically transmissive plate 20 to rear polarizer 22. Rear polarizer 22 is set crossed to front polarized 10, so that light passing directly through the liquid crystal composition will be blocked by the rear polarizer, while light which has been rotated by the twisted nematic liquid crystal will be properly oriented to pass through the rear polarizer. Light admitted through rear polarizer 22 will meet transflector 24 and be reflected back out through the device for observation by a viewer as a bright segment; nonrotated light, blocked by the second, crossed polarizer, will not meet and be reflected by transflector 24, and corresponding segments will appear dark to a viewer. Accordingly, by selective application of an electric field only across selected electrode elements, a display of bright and dark segments can readily be arranged in a numerical or other desired pattern.

Under low ambient light conditions, however, the appearance of the display is degraded in that contrast between bright and dark segments becomes indistinct. To enhance a viewability of the display in order to provide distinct element definition, even under conditions of insufficient ambient light, the device is equipped with internal light source 30.

By closing switch 38, light source 30 is activated and light is introduced to the liquid crystal display arrangement from the rear through nacreous transflector layer 24. The nacreous transflector is capable of transmitting, as well as reflecting, light and, hence, the light passes through the transflector to be polarized by optical polarizer element 22. Then, in reverse fashion to the previously described course of light introduced from the front, the polarized light will successively pass through plate 20 and conductive coating 18 and into liquid crystal composition 16 where it is either rotated 90° or left unchanged, depending on the selective application of an electric field across the liquid crystal. Then the light will be transmitted through conductive coating 14 and plate 12 to meet front optical polarizer sheet 10. Since polarizer 10 is set crossed to polarizer 22, light rotated through twisted portions of the liquid crystal will pass through the polarizer and be observed as bright segments; light not rotated through liquid crystal portions affected by selectively applied electric fields will be blocked by the polarizer and corresponding areas will be observed as dark segments.

In FIG. 3, a preferred transflector embodiment is depicted in which a nacreous transflector layer 48 is disposed on one side of an optical polarizer element 42. Optical polarizer element 42 is a polyvinyl alcohol-iodine complex synthetic polarizer. The polarizer element comprises a unidirectionally stretched, linearly oriented polyvinyl alcohol sheet 45 (the linear molecular orientation represented by lines 43) stained with a polyiodide solution (the dye represented by dots 44) and sandwiched between two transparent isotropic plastic sheets 46 and 47, typically cellulose acetate butyrate. Nacreous layer 48, comprising pigment platelets 50 dispersed in binder medium 49, is coated on one side of the polarizer element 42 to form a unitary polarizer/transflector element 52. This polarizer/transflector element is used in a display device as the rear polarizer element with its polarizer side 42 facing the front of the device and the transflector side 48 facing the rear.

The following examples are provided to further illustrate the invention. It will be understood that the examples are intended to be illustrative and not limiting in nature.

EXAMPLES I–IV

Nacreous pigment dispersions were prepared by blending nacreous pigment material (obtained under the trademark "Mearlin Sparkle," from Mearl Corporation) in an aqueous solution of polyvinyl alcohol resin (obtained commercially under the trademark "ELVANOL" from E. I. duPont de Nemours).

In order to enhance the brightness of coatings of the nacreous dispersion, a small amount of titanium dioxide pigment was added to some of the dispersions; finely divided silica also was added to selected dispersions to impart a grainy appearance to the nacreous coating (the $TiO_2$ pigment used was obtained under the trademark "TITANOX" from Titanium Pigment Corporation; the finely divided silica was obtained commercially under the trademark "SYLOID" from W. R. Grace Co.). The titanium dioxide and silica additives were introduced to the nacreous pigment dispersion in the form of individual preblended aqueous dispersions. These additive dispersions consisted of 70.0 parts by weight water, 30.0 parts by weight additive and 0.1 parts by weight of a dispersant tetrasodium pyrophosphate (TSPP). Using a blender, the TSPP first was dissolved in water, and then the additive $TiO_2$ or silica was added slowly with moderate speed stirring. The prepared nacreous pigment dispersion compositions are outlined in Table A below.

Coatings were made by applying the nacreous pigment dispersion to a 3.0 mil cellulose triacetate sheet, using a doctor blade with a 2 or 4 mil gap (the cellulose triacetate was obtained under the trademark KODACEL TA-401 from Tennessee Eastman Chemical Company). Coatings were dried in a circulating air oven at 90° C. for 3 minutes.

Visual observation of the prepared transflector coatings indicated favorable transmittance and reflectance properties.

TABLE A

| DISPERSION COMPOSITION (PARTS BY WEIGHT) | | | | | |
|---|---|---|---|---|---|
| Example | Polyvinyl Alcohol | Nacreous Pigment | $TiO_2$ | Silica[5] | Surfactant[4] |
| I | 100[1] | 10 | — | — | 0.2 |
| II | 100[2] | 10 | — | — | 0.2 |
| III | 100[1] | 10 | 0.5[3] | — | 0.2 |
| IV | 100[1] | 10 | — | 2 | 0.2 |

[1]'Elvanol 90-50
[2]'Elvanol 82-85
[3]'Titanox RA-900
[4]'Fluorad FC-170 Obtained commercially from the 3M Company
[5]'Syloid 620

EXAMPLE V

A dispersion of nacreous pigment meterial was formulated by blending a mixture of nacreous pigments in an aqueous solution of polyvinyl alcohol resin. To prepare the dispersion, 88 g of polyvinyl alcohol resin (obtained commercially under the trademark "ELVANOL 90-50" from E. I. duPont de Nemours) first was dropped, with stirring, into a 3 neck, round bottom, 1 liter flask containing 500 cc of water. The flask was equipped with a stirrer, a thermometer and a condenser. While continuing to stir the contents, the flask was heated on a steam bath to 90° C. and held at the temperature for about 15 minutes. The heat was then turned off and 44 g of nacreous pigment material was added to the solution; the pigment used was a mixture (50/50 by weight) of two pigment materials commercially available under the traemarks "MEARLIN SPARKLE" and "SUPERSILK" from Mearl Corporation. The flask contents were stirred as they were allowed to cool down to room temperature. Once cooled, the system was placed under vacuum and bled repeatedly to eliminate any air present in the mixture. 29 g of a 40% glyoxal crosslinker then was added and the mixture was stirred for about 10 minutes, after which 1.0 cc of phosphoric acid (85%) was introduced.

About 0.1 to about 1% (based on total solids weight) of a wetting agent (obtained under the trademark "AEROSOL-OT" from American Cyanamid Company) was added, and the dispersion was coated at four different coverages on a synthetic polarizer element. A conventional loop coater was employed. Coverages applied were 2500 mg/ft$^2$ (26910 mg/m$^2$), 3500 mg/ft$^2$ (37674 mg/m$^2$), 5000 mg/ft$^2$ (53820 mg/m$^2$) and 7000 mg/ft$^2$ (75347 mg/m$^2$). The polarizer was a polyvinyl alcohol-iodine complex polarizer, comprising a unidirectionally stretched, linearly oriented polyvinyl alcohol sheet, stained with a polyiodide solution, and sandwiched between sheets of cellulose acetate butyrate; it is commercially available from Polaroid Corporation under the designation "HNT-48.". The coated polarizer sheets were dried in a circulating air oven at 90° C. for about 3 minutes.

Each of the nacreous material-coated polarizer/transflector elements prepared exhibited favorable transmittance and reflectance properties. The element having the heaviest loading of nacreous pigment (7000 mg/ft$^2$) appeared to exhibit some surface irregularity.

While the invention has been particularly shown and described with reference to preferred embodiments thereof, it will be understood by those skilled in the art that various modifications in form and detail may be made therein without departing from the spirit and scope of the invention. For example, the disposition of the individual polarizer elements within a twisted nematic liquid crystal display can readily be modified to assume a parallel rather than a crossed relationship. In this arrangement, display areas across which an electric field is applied will appear bright from reflected light and areas not affected by an electric field will remain dark. Further, however, although the present invention has been described in detail in conjunction with liquid crystal electrooptical display devices, the invention is not limited to liquid crystal devices. Utility of the subject nacreous transflector extends to any other illuminated electro-optical device, including electrochromic, electrophoretic, electrolytic, and the like.

What is claimed is:

1. An electro-optical display device having an arrangement of front and rear light polarizers sandwiching front and rear optically-transmissive plates with a layer of a twisted nematic liquid crystal composition confined therebetween; means to impose a voltage between selected portions of said front and rear optically-transmissive plates and an illumination system comprising an internal light source positioned behind the rear optically-transmissive plate of the display and a nacreous transflector layer coated onto the back surface of said rear light polarizer, said nacreous transflector layer comprising a nacreous pigment material effective both to reflect light passing through said display from the front, as well as to transmit light into said display device emitted from the rear internal light source.

2. The electro-optical device of claim 1 wherein said nacreous transflector layer comprises a layer of nacreous pigment material dispersed in a binder medium.

3. The electro-optical display device of claim 2 wherein said binder is polyvinyl alcohol.

4. The electro-optical display device of claim 1 wherein said layer of nacreous pigment material has a coverage of about 2500 to about 7000 mg/ft$^2$.

5. A transflector element comprising a layer of nacreous pigment material coated onto one surface of a light polarizer.

6. The transflector element of claim 5 wherin said nacreous pigment material is dispersed in a binder medium.

7. The transflector element of claim 5 where said nacreous pigment is titanium dioxide-coated mica.

8. The tranflector element of claim 5 wherein the nacreous pigment material has a coating coverage of about 2500 to about 7000 mg/ft$^2$.

9. A transflector element comprising a layer of nacreous pigment material coated onto one surface of a polyvinyl alcohol-iodide complex light polarizer.

10. The transflector element of claim 9 wherein said light polarizer comprises a unidirectionally stretched, linearly oriented polyvinyl alcohol sheet, stained with a polyiodide solution, and supported on a sheet of cellulose acetate butyrate.

11. The transflector element of claim 4 wherein said nacreous pigment material is dispersed in a binder medium of polyvinyl alcohol.

* * * * *